Aug. 11, 1964  N. J. HARRIS  3,144,274
MAGNETIC ANCHOR FOR SEAT BELT BUCKLES
Filed Aug. 8, 1962

Norvin J. Harris
INVENTOR.

BY Oliver D. Olson
Agent

United States Patent Office 3,144,274
Patented Aug. 11, 1964

3,144,274
MAGNETIC ANCHOR FOR SEAT BELT BUCKLES
Norvin J. Harris, 1925 N. 17th St., Salem, Oreg.
Filed Aug. 8, 1962, Ser. No. 215,672
5 Claims. (Cl. 297—385)

This invention relates to seat belts, and more particularly to a magnetic anchor adapted for releasable mounting upon an automobile seat for holding the seat belt buckles in a position of storage when the seat belt is not in use.

It is a general experience in the use of automobile seat belts that when the seat belt sections are uncoupled to release the passenger, the sections fall away in haphazard manner to some disorderly position on the floor of the automobile or out through the opened door. In the latter instance damage to the door and to the seat belt may result. In either instance the next passenger to use the belts is confronted with the annoying problem of groping for the seat belt sections. Additionally, the haphazard disarrangement of seat belt sections over the floor of the automobile presents a hazard to other passengers entering or leaving the automobile, and further contributes to soiling of the seat belt sections and hence the clothes with which they come in contact.

Accordingly, it is the principal object of the present invention to provide a magnetic anchor adapted for releasable mounting upon the seat of an automobile in appropriate position for holding a seat belt buckle for storage when the seat belt is not in use, whereby to overcome the problems enumerated hereinbefore.

Another important object of this invention is the provision of a magnetic anchor for seat belt buckles, which anchor is of simplified construction for economical manufacture, is adaptable for use with the various types of conventional automobile seats, and is capable of installation with speed and facility.

The foregoing and other objects and advantages of this invention will appear from the following detailed description, taken in connection with the accompanying drawings in which.

Figure 1:
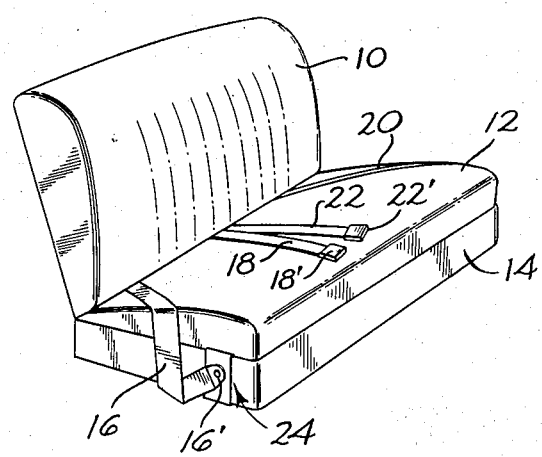
FIG. 1 is a perspective view of an automobile seat showing mounted thereon a magnetic anchor embodying the features of the present invention.

Referring to FIG. 1, the automobile seat illustrated therein includes the back rest cushion 10, the seat cushion 12 and the peripheral kick board 14. The kick board is supported by a frame (not shown) on which the seat cushion is removably mounted, and the kick board is spaced outward from the sides of the seat cushion. The seat illustrated is a full width sedan front seat, but it will be apparent that the present invention is equally adaptable for use with "bucket" seats. Further, in some types of seats the kick board does not extend the full length of the seat at the front and rear sides, since the area of major protection is at the lateral ends of the seat.

In the sedan seat illustrated it is conventional practice to install two pairs of seat belts; Thus, the strap sections 16 and 18 form one pair and the strap sections 20 and 22 form the second pair. Each strap is secured at its rearward end to the automobile body, to the rear of the seat, and projects forward between the back rest cushion and seat cushion. The forward ends of the straps forming each pair mount the cooperating male and female sections 16', 18' 20', and 22', respectively of the seat belts buckles.

In another form of seat belt, commonly used by commercial airlines, the entire buckle is mounted on one of the straps of a pair and the other strap may be secured adjustably thereto. In this type of belt the section carrying the buckle preferably is located at the end of the seat.

In accordance with the present invention, a magnetic anchor device 24 is provided for mounting at a position on the kick board within convenient reach of a passenger and within reach of the magnetic buckle component, for supporting the latter in position for storage when the seat belt is not in use.

Referring now to FIGS. 2–5, the magnetic anchor illustrated therein includes an elongated base strip 30 of plastic, cloth, or other suitably flexible, non-magnetic material. In the central area of the strip is located a flat magnet 32 which is secured to the strip by any suitable means. In the embodiment illustrated, the strip is made of synthetic thermoplastic resin sheet with the magnet embedded in it. Thus a portion 31 of the strip covers the magnet to conceal it and prevent it from marking objects which come in contact with it.

Means is provided for rendering the strip bendable to a retainable shape. In the embodiment illustrated, such means is provided by the elongated strips 34 of deformable metal such as lead, aluminum, or others. The metal strips are secured to the flexible base strip along the side margins of the latter, as by means of embedding the strips in the plastic during molding. Alternatively, the strips may be adhesively bonded to the outer or inner surface of the base strip. Still further, the spaced metal strips may be replaced by a single strip. In either case the ductile metal stripping need not extend the full length of the base strip, but may be provided only at the end areas of the base strip which are required to be bent.

Figure 3:
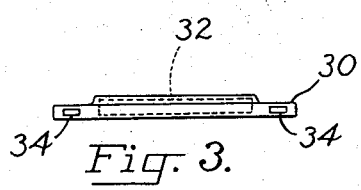
FIG. 3 is an end elevation as viewed from the top in FIG. 2.
Figure 2:
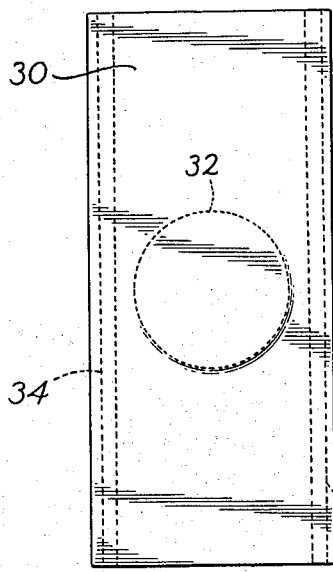
FIG. 2 is a view in front elevation of one form of magnetic anchor embodying features of the present invention.
Figure 4:
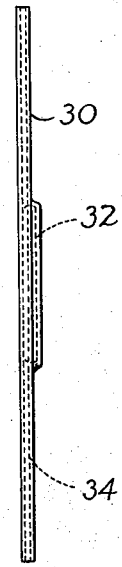
FIG. 4 is a view in side elevation as viewed from the right in FIG. 2.
Figure 5:
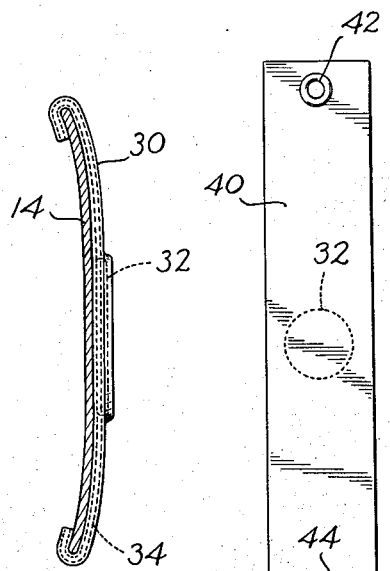
FIG. 5 is a sectional view in side elevation showing the magnetic anchor of FIGS. 2–4 in mounted position on the kick board of an automobile seat.

Referring particularly to FIG. 5 of the drawing, the base strip 30 is shown overlying the outer surface of the automobile seat kick board 14, with the opposite ends of the base strip bent around the top and bottom edges of the kick board, whereby to retain the magnetic anchor in desired position.

Figure 6:
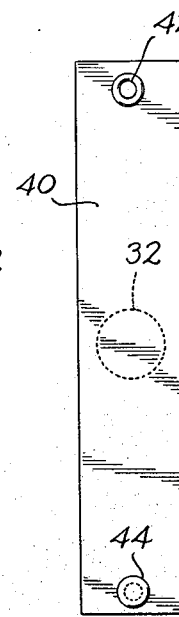
FIG. 6 is a view in front elevation of a second form of magnetic anchor embodying the features of the present invention.

In FIG. 6 of the drawing the elongated flexible base strip 40 is provided adjacent its opposite ends with the cooperating male and female sections 42 and 44, respectively, of a conventional snap fastener. The strip may be dimensioned to snugly encircle the kick board when the snap fasteners are in position for mutual engagement. Alternatively, the base strip may be made of elastic material which may be stretched about the kick board for connection of the snap fastener elements. After connection the strip may be slid around the kick board to place the magnet in proper position.

Figure 7:
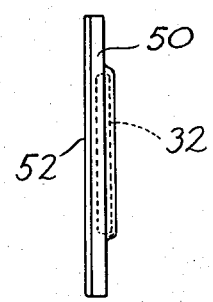
FIG. 7 is a side elevation of a further embodiment of the present invention.

In the event the automobile seat is not provided with a kick board, or if it is more desirable to mount the magnetic anchor directly upon the seat or upon the sides or other surface of the back seat cushion, the structure illustrated in FIG. 7 may be employed. In this form of magnetic anchor the base 50 supporting the magnet 32 is provided on its rear surface with a layer 52 of adhesive, preferably of the pressure sensitive type, by which the anchor may be secured releasably to the seat.

The magnetic anchor of the present invention thus is capable of being mounted detachably and adjustably on an automobile seat or kick board in any desired position, without in any way modifying or permanently disfiguring or damaging the seat or kick board. The anchor 24 preferably is mounted on the seat or kick board in a position such that when the buckle is supported magnetically by the magnet 32, the seat belt strap is disposed in an orderly manner and held against substantial displacement.

It will be apparent to those skilled in the art that various changes may be made in the details of construction described hereinbefore, without departing from the spirit of this invention and the scope of the appended claims.

Having now described my invention and the manner in which it may be used, what I claim as new and desire to secure by Letters Patent is:

1. A magnetic anchor for automobile seat belts, comprising a flexible base of non-magnetic material, a magnet enclosed within the base and automobile seat attaching means on the base for securing the latter detachably on an automobile seat.

2. A magnetic anchor for automobile seat belts, comprising a base strip of flexible non-magnetic material adapted to at least partially encircle the kick board of an automobile seat, a magnet enclosed within the base strip, and automobile seat attaching means on the base strip adjacent the opposite ends thereof for securing the strip detachably on the kick board.

3. The magnetic anchor of claim 2 wherein the attaching means comprises deformable metal secured integrally to the base strip adjacent the opposite ends of the latter and adapted to be bent with the base strip around the top and bottom edges of a kick board.

4. A magnetic anchor for seat belts, comprising: a flexible base strip of non-magnetic material, said base strip having opposite free ends; a magnet carried by said base strip intermediate said free ends; and automobile seat attaching means on the base strip for securing the latter detachably on an automobile seat.

5. The magnetic anchor of claim 4 which includes non-magnetic means covering the magnet to protect objects from being marred by contact with the magnet.

References Cited in the file of this patent

UNITED STATES PATENTS

| | | |
|---|---|---|
| 1,508,143 | Kneen | Sept. 9, 1924 |
| 2,176,052 | Beyer | Oct. 17, 1939 |
| 2,212,326 | Piken | Aug. 20, 1940 |
| 2,595,833 | Flaherty | May 6, 1952 |
| 2,598,901 | Garland | June 3, 1952 |
| 3,076,679 | Lorber | Feb. 5, 1963 |